April 29, 1947.  T. S. BRISKIN ET AL  2,419,759
MECHANISM FOR INTERMITTENTLY ADVANCING FILM
Filed Aug. 13, 1945   2 Sheets-Sheet 1
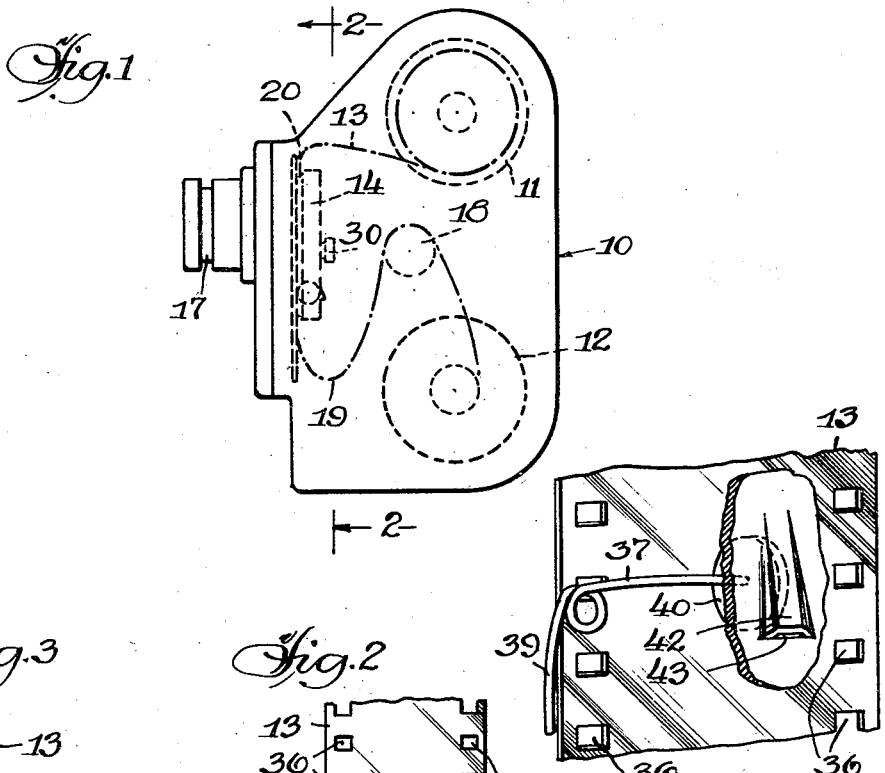
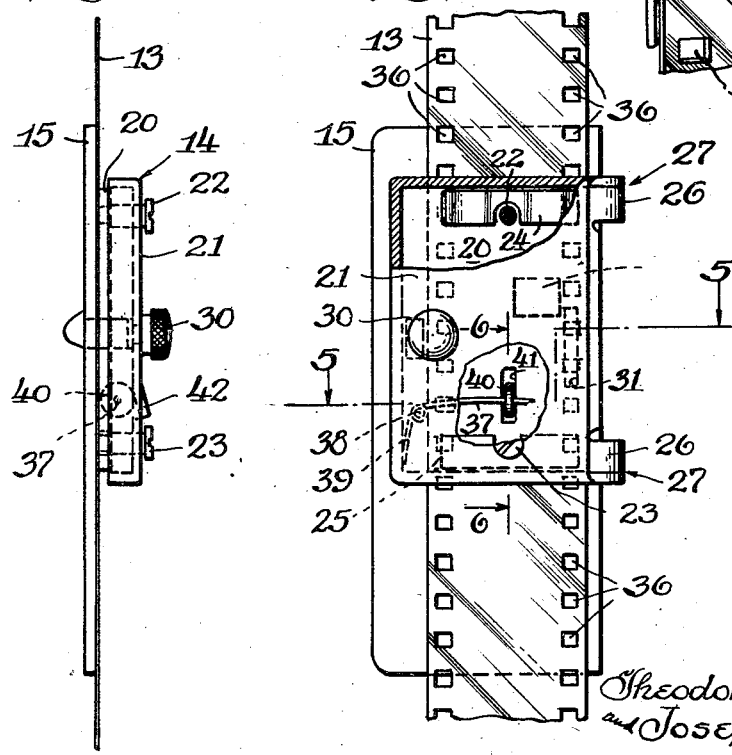
INVENTORS
Theodore S. Briskin
and Joseph J. Golick,
Zabel and Fritzbaugh
Attys.

April 29, 1947. T. S. BRISKIN ET AL 2,419,759
MECHANISM FOR INTERMITTENTLY ADVANCING FILM
Filed Aug. 13, 1945 2 Sheets-Sheet 2

INVENTORS.
Theodore S. Briskin
and Joseph J. Golick,
Zabel and Gritzbaugh Attys

Patented Apr. 29, 1947

2,419,759

UNITED STATES PATENT OFFICE 2,419,759

MECHANISM FOR INTERMITTENTLY ADVANCING FILM

Theodore S. Briskin and Joseph J. Golick, Chicago, Ill., assignors to Revere Camera Company, Chicago, Ill., a corporation of Delaware Application August 13, 1945, Serial No. 610,444

8 Claims. (Cl. 88—18.4)

This invention relates to improvements in mechanism for intermittently advancing film.

In motion picture apparatus, such as a camera, film is advanced step by step past the lens unit with an intermittent motion, so that the film will be stationary during the period of exposure. Other portions of the film, however, are advanced continuously, and in particular, that portion of the film which is fed to the take-up reel.

The intermittent motion of the film through the film gate is caused by a reciprocating transport finger which engages the film in its edge perforations. Difficulty has been experienced in the operation of this transport finger, for the reason that it often drags the film backward on the return stroke. This small increment of back slip causes a jumpy picture. It often happens that the finger may pull the film completely back, or far enough back so that the finger on its next forward stroke, will not be able to engage the succeeding perforation. In either case, there will, of course, be no change in the film motion past the film sprocket with the result that the slack loop between the film gate and the film sprocket is consumed. The film sprocket will then pull the film through the film gate at a constant speed and thus the synchronization of the movement of the film through the film gate with the shutter will be destroyed, and the film wasted.

It is an object of this invention to provide an improved mechanism for intermittently advancing film which prevents any backward movement of the film, thereby obviating the difficulties referred to in the preceding paragraph.

It is a further object to provide, in combination with a film transport finger, or like means, a check device which permits forward motion of the film, but checks any backward motion thereof.

A still further object is to provide, in combination with the film gate of a motion picture camera, a small check device which can be disposed within the film gate, and cooperates with a portion thereof to produce a wedging action which prevents reverse movement of the film.

Other objects, features and advantages will become apparent as this description proceeds.

With reference to the drawings, in which like reference numerals designate like parts, Fig. 1 is an elevation of a camera showing the general arrangement of the parts;

Fig. 2 is an enlarged view of the aperture plate and film gate;

Fig. 3 is an end view of the parts shown in Fig. 2;

Fig. 4 is an enlarged perspective view of the roller check;

Figure 5:
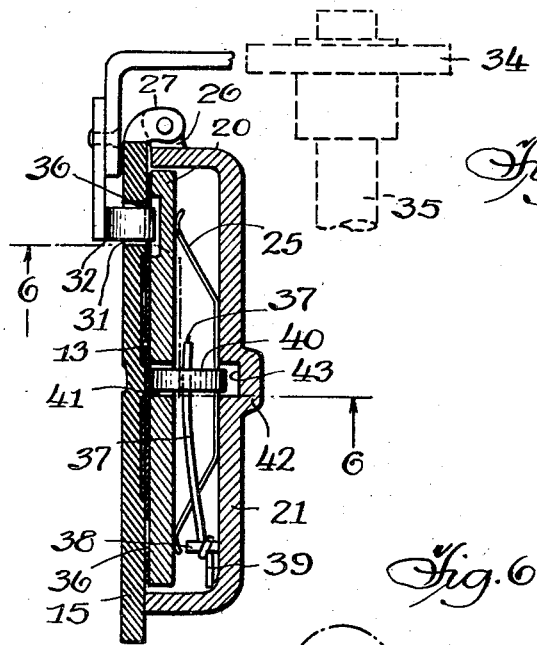
Fig. 5 is an enlarged section along line 5—5 of Figs. 2 and 6.

With reference now to Fig. 1, the reference numeral 10 designates generally a motion picture camera, and certain parts thereof are shown in phantom. The camera is provided with the usual supply reel 11 and take-up reel 12, the film being designated by the reference numeral 13. Between the two reels the film passes between a film gate 14 and an aperture plate 15, the latter being provided with an aperture 16, as shown in Fig. 2, which is aligned with the lens unit 17, shown in Fig. 1. A pull sprocket 18 is disposed between the film gate 14 and the take-up reel 12. The pull sprocket, in accordance with the usual practice, is driven continuously and controls the feed of the film to the take-up reel 12. Means, hereinafter described, cause the film 13 to be advanced intermittently past the aperture 16. The film is threaded through the parts so as to provide a slack loop 19 to compensate for the different types of movement imparted to the different portions of the film.

As pointed out above, one of the objects of this invention is to provide an improved mechanism for intermittently advancing the film between the aperture plate and the film gate in such a manner that the slack loop 19 is not consumed or taken up to an extent whereby the pull sprocket 18 drags the film past the aperture plate in a continuous motion.

The film gate comprises a pressure plate 20 which is mounted within a flanged cover 21 on shoulder screws 22 and 23. Springs 24 and 25 are confined between the pressure plate 20 and the cover 21 and urge the pressure plate 20 against the film in the proper focal plane. The film gate 14 is hingedly mounted on lugs 26 which project from the aperture plate 15, the hinged mounting being designated generally by the reference numeral 27.

A suitable latch 30 is provided in order to maintain the film gate in operative position. When threading the film, the gate is unlatched and swung open on hinges 27 to permit the film to be inserted between the film gate and the aperture plate.

Figure 6:
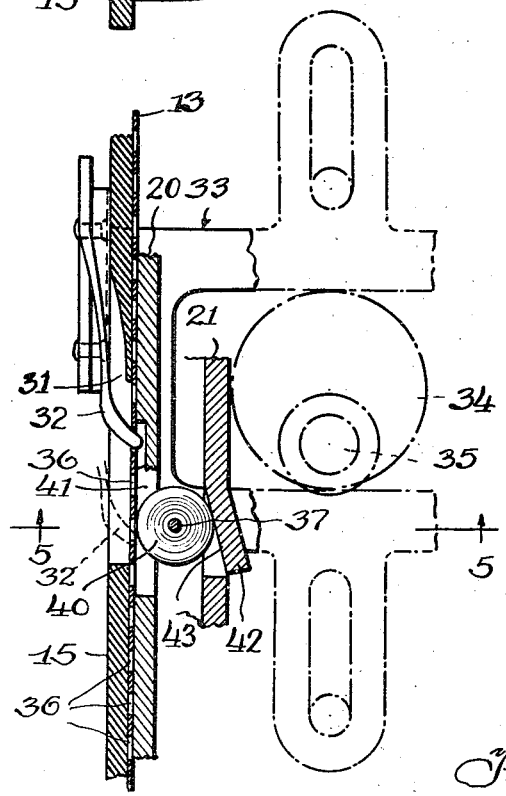
Fig. 6 is an enlarged section along lines 6—6 of Figs. 2 and 5.

As shown in Figs. 5 and 6, the aperture plate 15 is provided with a slot 31, and a resilient film transport finger 32 extends through said slot to engage the film apertures 36 in film 13. The film apertures 36 are the usual apertures which are engaged by the pull sprocket 18, and the slot 31 is in register with the line of travel of the film apertures.

Reciprocating movement is imparted to the film transport finger 32 by means of a scotch yoke 33, the yoke being suitably actuated, as by an eccentric 34 which is mounted on a shaft 35. The scotch yoke and the eccentric form no part of this invention, as it is evident that reciprocating motion may be imparted to the transport finger 32 by any suitable means.

The operation of the device is such that on its forward stroke, the transport finger 32 engages one of the film apertures 36 to move it forwardly. On its reverse motion, the resilience of the transport finger permits it to cam out of the film aperture 36, and to be retracted so that it will engage the next succeeding film aperture 36. The throw of the transport finger 32 is no less than the spacing between successive film apertures 36, and may be somewhat greater than this spacing.

It is evident that the tension of the film transport finger 32 must be less than the tension of the springs 24 and 25; otherwise, the pressure plate 20 would be displaced away from the film, and cause the film to move out of the focal plane. On the other hand, the tension of the springs 24 and 25 must not be sufficiently great as to impose a frictional load on the film which would prevent its displacement by the transport finger 32.

Although these limitations permit a certain amount of latitude in the design of the springs 24 and 25, it has been found that there is a tendency for the film to be displaced backwardly by the return stroke of the transport finger 32. Therefore, check means are provided to prevent the reverse motion of the film 13.

As shown in Figs. 5 and 6, this check means comprises a roller 40 which is mounted on a spring 37, the spring in turn being mounted on a pin 38 in the cover 21. The tail 39 of the spring bears against the flange of the cover 21, the arrangement being such that the roller 40 is urged backwardly. A slot 41 is provided in the pressure plate 20, through which slot the roller 40 extends in order that it may engage the surface of the film 13. The cover 21 is provided with a deformed portion 42, which forms a cam surface 43 against which the roller 40 bears.

In operation, it will be seen that the roller 40 permits the forward advance of the film 13, but any tendency for reverse movement of the film will cause the roller 40 to be wedged between the cam surface 43 and the film 13, which is backed up by the aperture plate 15. Thus backward movement of the film is prevented which might otherwise result in improper operation of the device, as pointed out above.

Figure 7:
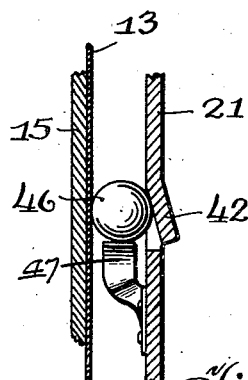

Fig. 7 illustrates a modified form of the invention, in which a ball 46 is substituted in place of the roller 40. The ball is held in position between the film 13 and the deformed portion 42 of cover 21, by means of a leaf spring 47, the leaf spring urging the ball backwardly into checked position. The operation of this modification is substantially the same as that of the roller 40.

Figure 8:
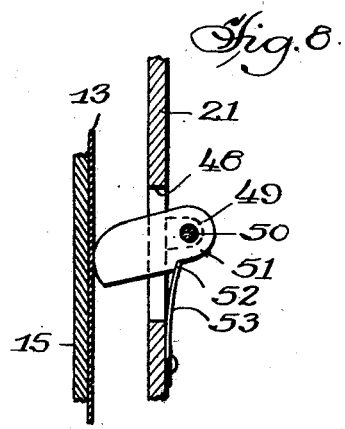
Figs. 7 and 8 are detail views showing modified forms of this invention.

In Fig. 8 a further modification is shown. The cover 21 is provided with a slot 48, in which slot a pivoted member 51 is disposed by means of a pin 50 which is seated in a lug 49. The lug 49 is struck up from the cover 21.

The pivoted member 51 is of sufficient length so that it bears against the film 13 in the manner shown in Fig. 8. A leaf spring 53, riveted to the cover 21, engages a shoulder 52 on the pivoted member 51, and urges the same into engagement with the film. This arrangement permits forward motion of the film but checks any backward motion thereof.

The particular embodiment of my invention herein shown has been applied to an 8 millimeter camera which takes pictures on a 16 millimeter film, first along one side thereof, and then along the other. The film is later slit down the middle and for that reason, the roller check 40, or its equivalent, may be disposed along the center of the film without producing any marks on the film which would show up after developing. However, it will be understood the invention is equally applicable for use with other types of motion picture apparatus, and in that event, the roller check or the like would preferably be disposed along one side of the film.

Although only certain preferred embodiments of this invention have been shown and described herein, it is obvious that various modifications and changes may be made without departing from the spirit of the invention as defined in the appended claims.

We claim:

1. In a motion picture camera, an aperture plate, a film gate spaced therefrom, said film gate including a pressure plate and a cover, means to urge said pressure plate toward said aperture plate, and a check device extending through said pressure plate and adapted to bear on the surface of a film which is advanced between said pressure plate and said aperture plate, said check device reacting against said cover to produce a wedging action which prevents motion of the film in one direction, but which permits motion of the film in the other direction.

2. In a motion picture camera, an aperture plate, a film gate spaced therefrom, reciprocating means for engaging a film intended to be advanced step by step between said aperture plate and said film gate, said film gate including a pressure plate and a cover, means to urge said pressure plate toward said aperture plate, and a check device extending through said pressure plate and adapted to bear on the surface of a film which is advanced between said pressure plate and said aperture plate, said check device reacting against said cover to produce a wedging action which prevents the motion of the film in one direction, but which permits motion of the film in the other direction, and a spring for urging said check device into wedged position.

3. In a motion picture camera, an aperture plate, a film gate spaced therefrom, intermittent film advancing means, said film gate including a pressure plate and a cover, means to urge said pressure plate toward said aperture plate, and a check device pivotally mounted on said cover and extending through said pressure plate, and a spring bearing on said check device to urge the same against the surface of a film which is advanced between said pressure plate and said aperture plate, said check device reacting against said cover to produce a wedging action which prevents motion of the film in one direction, but which permits motion of the film in the other direction.

4. In a motion picture camera, a backing plate over which a film is adapted to be advanced, a film gate having a portion spaced therefrom, said portion being deformed so as to provide a cam surface which is disposed at an angle to said backing plate, a rotatable element disposed between said cam surface and said backing plate, and means to urge said rotatable element in a direction opposite to the intended direction of movement of said film.

5. In a motion picture camera, a backing plate over which a film is adapted to be advanced, a film gate having a portion spaced therefrom, said portion being deformed so as to provide a cam surface which is disposed at an angle to said backing plate, a roller disposed between said cam surface and said backing plate, and means to urge said roller in a direction opposite to the intended direction of movement of said film.

6. In a motion picture camera, a backing plate over which a film is adapted to be advanced, a film gate having a portion spaced therefrom, said portion being deformed so as to provide a cam surface which is disposed at an angle to said backing plate, a ball disposed between said cam surface and said backing plate, and means to urge said ball in a direction opposite to the intended direction of movement of said film.

7. In a motion picture camera, a backing plate over which a film is adapted to be advanced, a film gate having a portion spaced therefrom, said portion being deformed so as to provide a cam surface which is disposed at an angle to said backing plate, and a roller disposed between said cam surface and said backing plate, and means to urge said roller in a direction opposite to the intended direction of movement of said film, said deformed portion being such as to confine said roller in a position wherein it will always be in operative position with respect to said cam surface.

8. In motion picture apparatus, a film having a series of spaced apertures and adapted to be advanced step by step, a resilient finger bearing against said film and disposed in the line of travel of said apertures, means to cause reciprocation of said finger whereby said finger is caused to drop in one of said apertures to advance the film in one direction, said finger being shaped so as to tend to cam itself out of said aperture as said finger is moved in the opposite direction, and means engaging said film to prevent movement thereof in said opposite direction, said means comprising a backing plate over which said film is adapted to be advanced by said finger, a film gate having a portion spaced from said backing plate, said portion being deformed so as to provide a cam surface which is disposed at an angle to said backing plate, a roller disposed between said cam surface and said backing plate, and means to urge said roller in a direction opposite to the intended direction of movement of said film, said deformed portion being such as to confine said roller in a position wherein it will always be in operative position with respect to said cam surface.

THEODORE S. BRISKIN.
JOSEPH J. GOLICK.

REFERENCES CITED

The following references are of record in the file of this patent:

UNITED STATES PATENTS

| Number | Name | Date |
|---|---|---|
| 1,984,143 | Kraft | Dec. 11, 1934 |